(12) United States Patent
Du et al.

(10) Patent No.: US 11,394,967 B2
(45) Date of Patent: Jul. 19, 2022

(54) GEOMETRIC CROSS-COMPONENT FILTERING

(71) Applicant: TENCENT AMERICA LLC, Palo Alto, CA (US)

(72) Inventors: Yixin Du, Los Altos, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/077,564

(22) Filed: Oct. 22, 2020

(65) Prior Publication Data

US 2021/0337193 A1    Oct. 28, 2021

Related U.S. Application Data

(60) Provisional application No. 63/015,586, filed on Apr. 26, 2020.

(51) Int. Cl.
| | | |
|---|---|---|
| *H04N 19/00* | (2014.01) | |
| *H04N 19/117* | (2014.01) | |
| *H04N 19/80* | (2014.01) | |
| *H04N 19/176* | (2014.01) | |
| *H04N 19/132* | (2014.01) | |
| *H04N 19/186* | (2014.01) | |
| *H04N 19/60* | (2014.01) | |

(52) U.S. Cl.
CPC ......... *H04N 19/117* (2014.11); *H04N 19/132* (2014.11); *H04N 19/176* (2014.11); *H04N 19/186* (2014.11); *H04N 19/60* (2014.11); *H04N 19/80* (2014.11)

(58) Field of Classification Search
CPC .. H04N 19/117; H04N 19/132; H04N 19/176; H04N 19/186; H04N 19/60; H04N 19/80
See application file for complete search history.

(56) References Cited

U.S. PATENT DOCUMENTS

| | | |
|---|---|---|
| 6,023,525 A | 2/2000 | Cass |
| 2009/0190659 A1 | 7/2009 | Lee et al. |
| 2016/0241881 A1 | 8/2016 | Chao et al. |
| 2017/0238020 A1 | 8/2017 | Karczewicz et al. |
| 2018/0041778 A1* | 2/2018 | Zhang ................ H04N 19/157 |
| 2018/0063527 A1* | 3/2018 | Chen .................. H04N 19/635 |
| 2018/0288441 A1* | 10/2018 | Zhang .................. H04N 19/80 |

(Continued)

FOREIGN PATENT DOCUMENTS

WO    2020/135346 A1    7/2020

OTHER PUBLICATIONS

Steinar Midtskoget et al., "The AV1 Constrained Directional Enhancement Filter (CDEF)", Oct. 28, 2017, 5pages.

(Continued)

*Primary Examiner* — Zhihan Zhou
(74) *Attorney, Agent, or Firm* — Sughrue Mion, PLLC

(57) ABSTRACT

A method, computer program, and computer system is provided for encoding and decoding video data. Video data is received, and a directionality of a sample block of the received video data is determined. The directionality corresponds to a descriptor, such as edge direction or gradient. A geometric transformation is applied based on the determined directionality. The video data is decoded based on the applied geometric transformation.

18 Claims, 9 Drawing Sheets

(56) References Cited

U.S. PATENT DOCUMENTS

| | | | |
|---|---|---|---|
| 2019/0306502 A1* | 10/2019 | Gadde | H04N 19/132 |
| 2019/0306534 A1* | 10/2019 | Zhang | H04N 19/70 |
| 2021/0092372 A1* | 3/2021 | Misra | H04N 19/46 |
| 2021/0195183 A1* | 6/2021 | Hu | H04N 19/186 |
| 2021/0235078 A1* | 7/2021 | Hu | H04N 19/132 |
| 2021/0306673 A1* | 9/2021 | Sarwer | H04N 19/186 |

OTHER PUBLICATIONS

Debargha Mukherjee et al., "A Switchable Loop-Restoration With Side-Information Framework for the Emerging AV1 Video Codec", ICIP 2017, pp. 265-269.

John Canny, "A Computational Approach to Edge Detection", IEEE Transactions on Pattern Analysis and Machine Intelligence, Nov. 1986, pp. 679-698, vol. PAMI-8. No. 6.

Benjamin Bross et al., "Versatile Video Coding (Draft 6)", Joint Video Experts Team (JVET) of ITU-T SG 16 WP 3 and ISO/IEC JTC 1/SC 29/WG 11, Jul. 3-12, 2019, 461pages.

Thomas J. Daede et al., "Daala: A Perceptually-Driven Next Generation Video Codec", Mar. 10, 2016, 10pages.

Chia-Yang Tsai et al., "TE10 Subtest2: Coding Unit Synchronous Picture Quadtree-based Adaptive Loop Filter", Joint Collaborative Team on Video Coding (JCT-VC) of ITU-T SG16 WP3 and ISO/IEC JTC1/SC29/WG11, Oct. 2010, 12pages.

Jonathan Taquet et al., "CE5: Results of tests CE5-3.1 to CE5-3.4 on Non-Linear Adaptive Loop Filter", Joint Video Experts Team (JVET) of ITU-T SG 16 WP 3 and ISO/IEC JTC 1/SC 29 WG 11, Mar. 19-27, 2019, 10pages.

Kiran Misra et al., "Cross-Component Adaptive Loop Filter for chroma", Joint Video ExpertsTeam (JVET) of ITU-T SG 16WP 3 and ISO/IEC JTC 1/SC 29/WG 11, Jul. 3-12, 2019, 9pages.

K. Misra et al., "CE5-related: On the design of CC-ALF", Oct. 1-11, 2019, 6pages.

Benjamin Bross et al., "Versatile Video Coding (Draft 7)", Joint Video Experts Team (JVET) of ITU-T SG 16 WP 3 and ISO/IEC JTC 1/SC 29/WG 11, Oct. 1-11, 2019, 492pages.

International Search Report dated Jul. 7, 2021 from the International Searching Authority in International Application No. PCT/US2021/027024.

Written Opinion dated Jul. 7, 2021 from the International Searching Authority in International Application No. PCT/US2021/027024.

\* cited by examiner

GEOMETRIC CROSS-COMPONENT FILTERING

CROSS-REFERENCE TO RELATED APPLICATION

This application claims priority from U.S. Provisional Patent Application No. 63/015,586, filed on Apr. 26, 2020, in the U.S. Patent and Trademark Office, which is incorporated herein by reference in its entirety.

FIELD

This disclosure relates generally to field of data processing, and more particularly to video encoding and decoding.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

SUMMARY

Embodiments relate to a method, system, and computer readable medium for coding video data. According to one aspect, a method for coding video data is provided. The method may include receiving video data. A directionality of a sample block of the received video data is determined. The directionality corresponds to a descriptor, such as edge direction or gradient. A geometric transformation is applied based on the determined directionality. The video data is decoded based on the applied geometric transformation.

According to another aspect, a computer system for coding video data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data. A directionality of a sample block of the received video data is determined. The directionality corresponds to a descriptor, such as edge direction or gradient. A geometric transformation is applied based on the determined directionality. The video data is decoded based on the applied geometric transformation.

According to yet another aspect, a computer readable medium for coding video data is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data. A directionality of a sample block of the received video data is determined. The directionality corresponds to a descriptor, such as edge direction or gradient. A geometric transformation is applied based on the determined directionality. The video data is decoded based on the applied geometric transformation.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
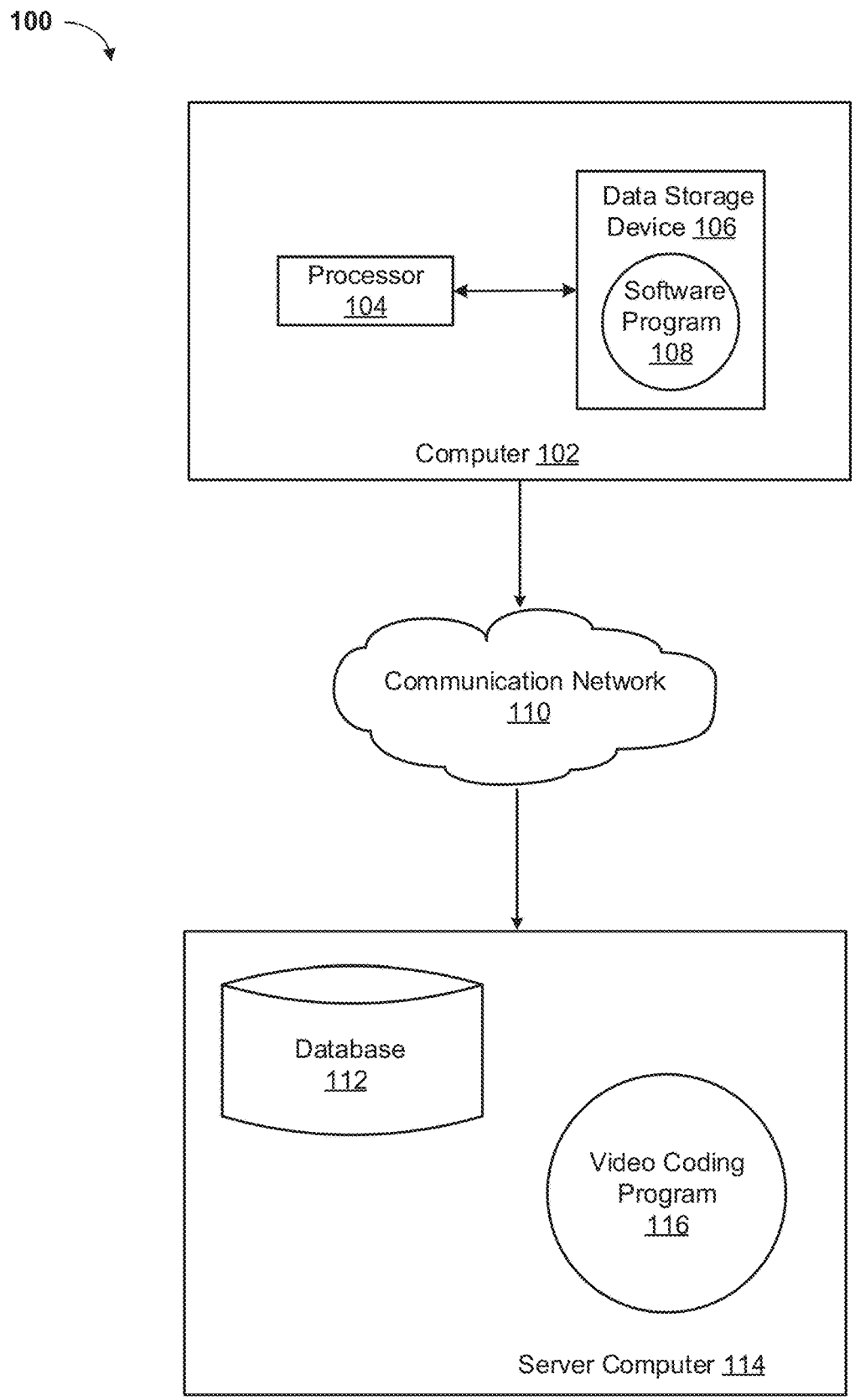
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, encode and decode video data based on applying a geometric transformation to a detected edge within the video data. Therefore, some embodiments have the capacity to improve the field of computing by allowing for improved encoding and decoding of video data through improved detecting of edges in the video data.

As previously described, AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

In AV1, cross-component filtering method is defined as a filtering process which uses the reconstructed samples of a first color component as input (e.g., Y or Cb or Cr), and the output is applied on a second color component which is a different color component of the first color component. However, in Cross-Component filtering (CCF), the directionality of samples is not considered, which may affect the performance of CCF. In ALF, geometric transformations of filter coefficients are applied to handle different directionality. For CCF, the geometric transformation of filter coefficients can be also applied, and it may help improve the coding efficiency. It may be advantageous, therefore, to consider the directionality of samples when training filter coefficients and performing filtering, determine the directionality of samples, and apply a geometric transformation to either filter coefficients or samples located in the filter support region for improved coding efficiency.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a video coding system 100 (hereinafter "system") for encoding and decoding video data based on applying a geometric transformation corresponding to an identified edge of the video data. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 8 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for coding video data based on applying a geometric transformation corresponding to an identified edge of the video data is enabled to run a Video Coding Program 116 (hereinafter "program") that may interact with a database 112. The Video Coding Program method is explained in more detail below with respect to FIG. 5. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
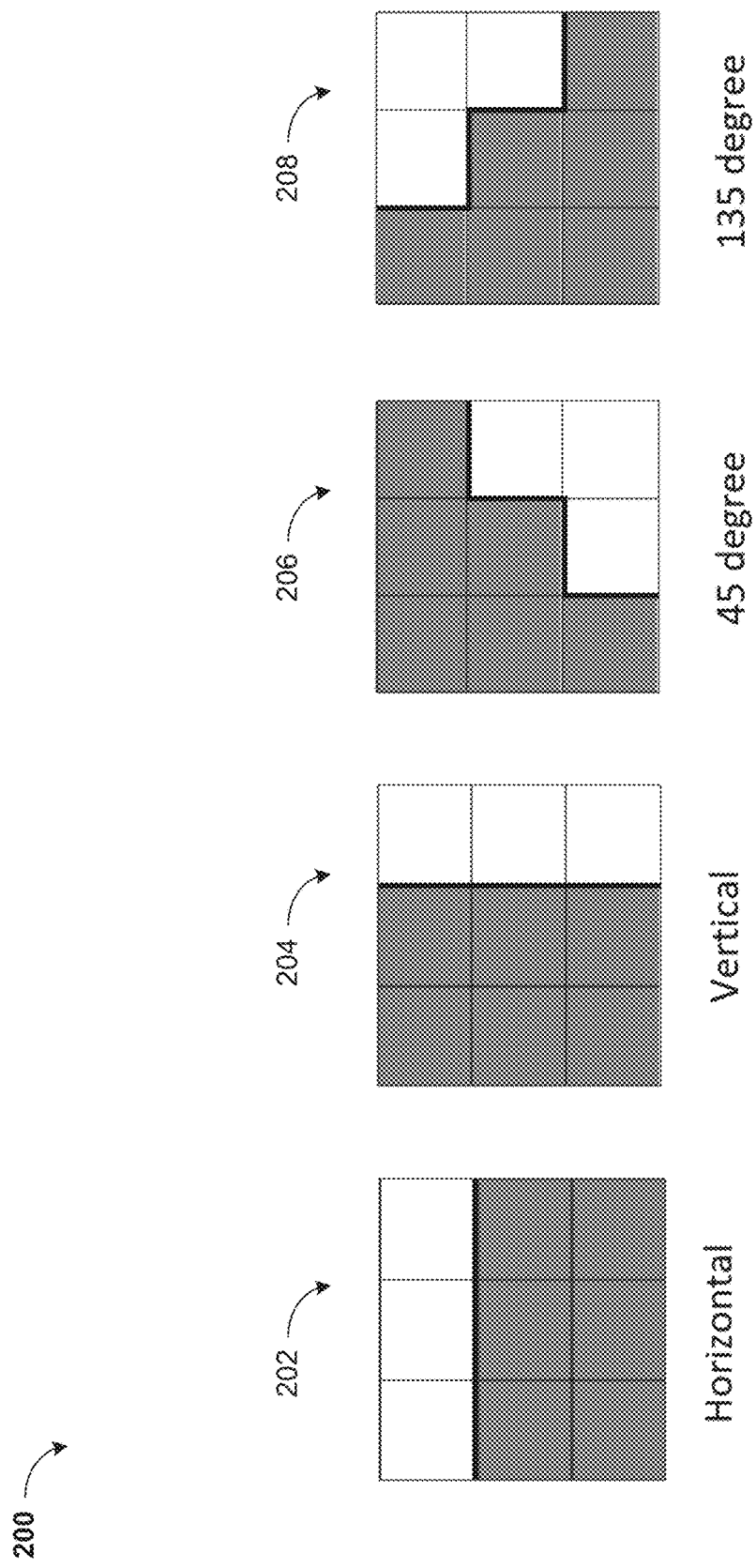
FIG. 2 is a diagram of exemplary edge directions of video data, according to at least one embodiment.

Referring now to FIG. 2, a diagram of exemplary edge directions 200 is depicted. An edge may denote a set of samples located at continuous positions of the video and image data where an abrupt change of intensity values occurs. An edge may have a direction that may denote a unit vector along the edge. An edge may have a position that may correspond to a sample position at which the edge is located. Edge detection, therefore, may correspond to a process that may be used to determine the edge direction and edge position. For example, edge detection may be performed by determining a gradient along the edge. The gradient may correspond to an increase or decrease of sample values along a direction which may be different from edge direction. A negative gradient value may correspond to sample intensity changing to smaller ones along a given direction, while a positive gradient value may correspond to sample intensity changing to larger ones along a given direction. The edge directions 200 may include, for example, a horizontal edge 202, a vertical edge 204, a 45-degree edge 206, and a 135-degree edge 208. It may be appreciated that given a large enough sample block size, substantially any angle of edge may exist.

According to one or more embodiments, a directionality of an M×N block, where M and N are positive integers, may be determined. Example values of M and N may include, for example, 2, 4, and 8. An input of this process may be an M×N block of samples, and an output may be a descriptor that may describe the directionality of current block. In one embodiment, edge direction is selected as the descriptor. An edge detection process may be applied to the current block, and the output of this process is edge direction and edge position. In one embodiment, edge direction is determined based on a direction search of a block having a smallest error value. The direction search operates on the reconstructed pixels, just after the deblocking filter. Since those pixels are available to the decoder, the directions require no signaling. The search operates on 8×8 blocks, which are small enough to adequately handle non-straight edges, while being large enough to reliably estimate directions when applied to a quantized image. Having a constant direction over an 8×8 region also makes vectorization of the filter easier. For each block we determine the direction that best matches the pattern in the block by minimizing the sum of squared differences (SSD) between the quantized block and the closest perfectly directional block. A perfectly directional block is a block where all of the pixels along a line in one direction have the same value. In one embodiment, edge detection is performed using Canny Edge detector. In one embodiment, edge detection is performed using Sobel Edge detector.

In one embodiment, gradient value is selected as descriptor. A process which computes the gradient value along specific directions is firstly applied to the current block. Example gradient directions include but not limited to horizontal, vertical, and diagonal (45-degree, 135-degree). In one embodiment, the M×N block of the input color component of CCF is used to determine the directionality in the above proposed method. In one example, when the input color component of CCF is Y component, the M×N block is taken from Y component. In one example, when the input color component of CCF is Cb component, the M×N block is taken from Cb component. In one example, when the input color component of CCF is Cr component, the M×N block is taken from Cr component.

In one embodiment, the M×N block of the output color component of CCF is used to determine the directionality in the above proposed method. In one example, when the output color component of CCF is Y component, the M×N block is taken from Y component. In one example, when the output color component of CCF is Cb component, the M×N block is taken from Cb component. In one example, when the output color component of CCF is Cr component, the M×N block is taken from Cr component.

Figure 3A:
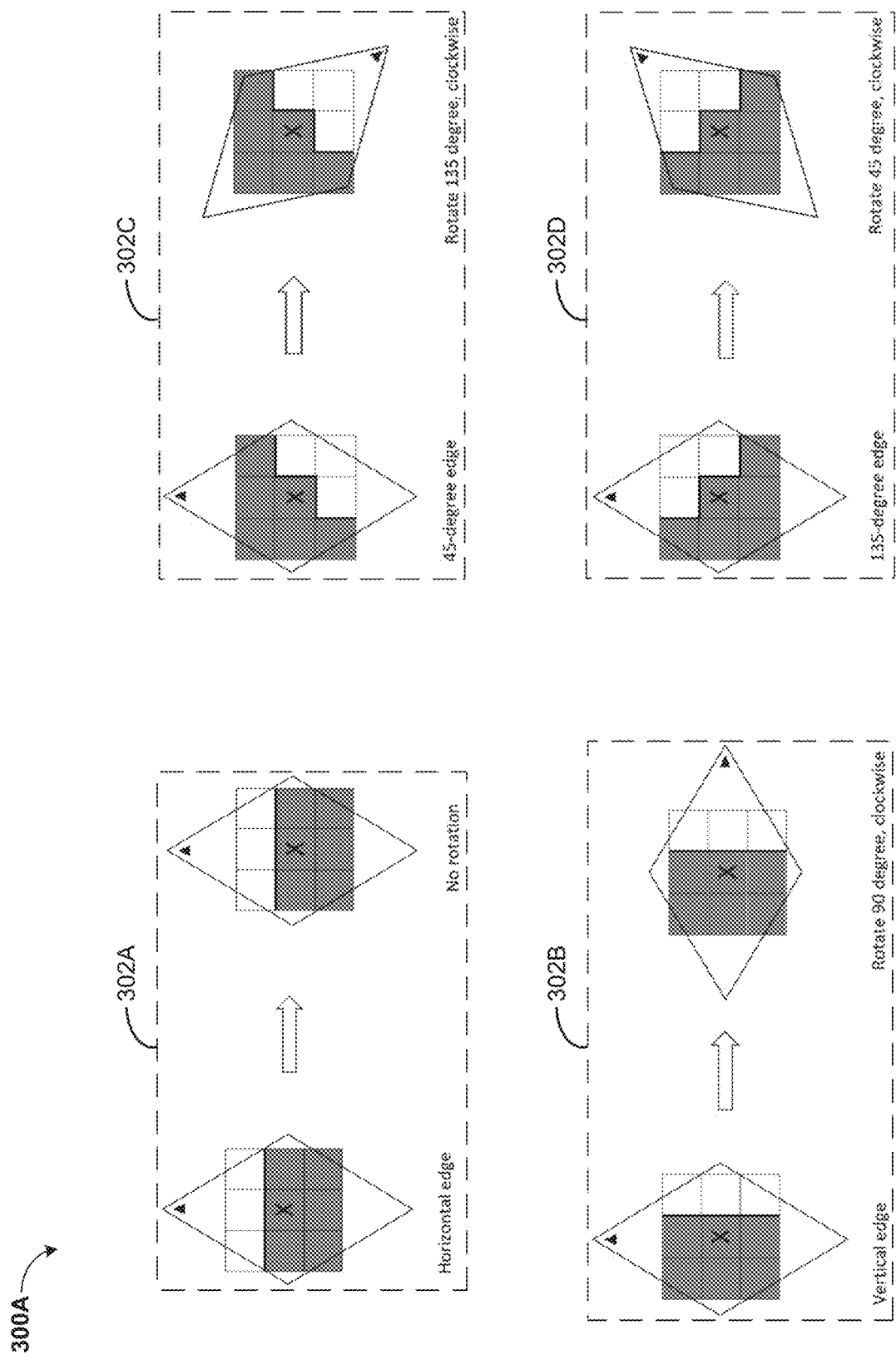
FIGS. 3A and 3B are exemplary geometric transformation processes, according to at least one embodiment.

Referring now to FIG. 3A, an exemplary geometric transformation process 300A is depicted. The geometric transformation process may include, among other things, one or more pre-defined rotations 302A-D. According to one or more embodiments, the geometric transformation process 300A may be applied in the filtering process of CCF. The input to this process is the directionality of samples in the examples described in reference to embodiments relevant to FIG. 2 above. Based on the directionality, the filter coefficients of CCF or the reconstructed samples in the filter support region are transformed. In one embodiment, when the directionality of the block is identified by edge direction, the filter coefficients or reconstructed samples in the filter support region are rotated based on the identified edge direction. In one embodiment, the target direction only includes one single direction. In one example, the target direction is horizontal direction. The rotation scheme is illustrated. When the edge direction of current block is horizontal, no rotation is performed. When the edge direction of current block is vertical, the filter coefficients or the samples in the filter support region are rotated 90 degree, clockwise. When the edge direction of current block is 45-degree, the filter coefficients or the samples in the filter support region are rotated 135 degree, clockwise. When the edge direction of current block is 135-degree, the filter coefficients or the samples in the filter support region are rotated 45 degree, clockwise. When current block is a smooth area, i.e., no edge detected, no rotation is performed.

Figure 3B:
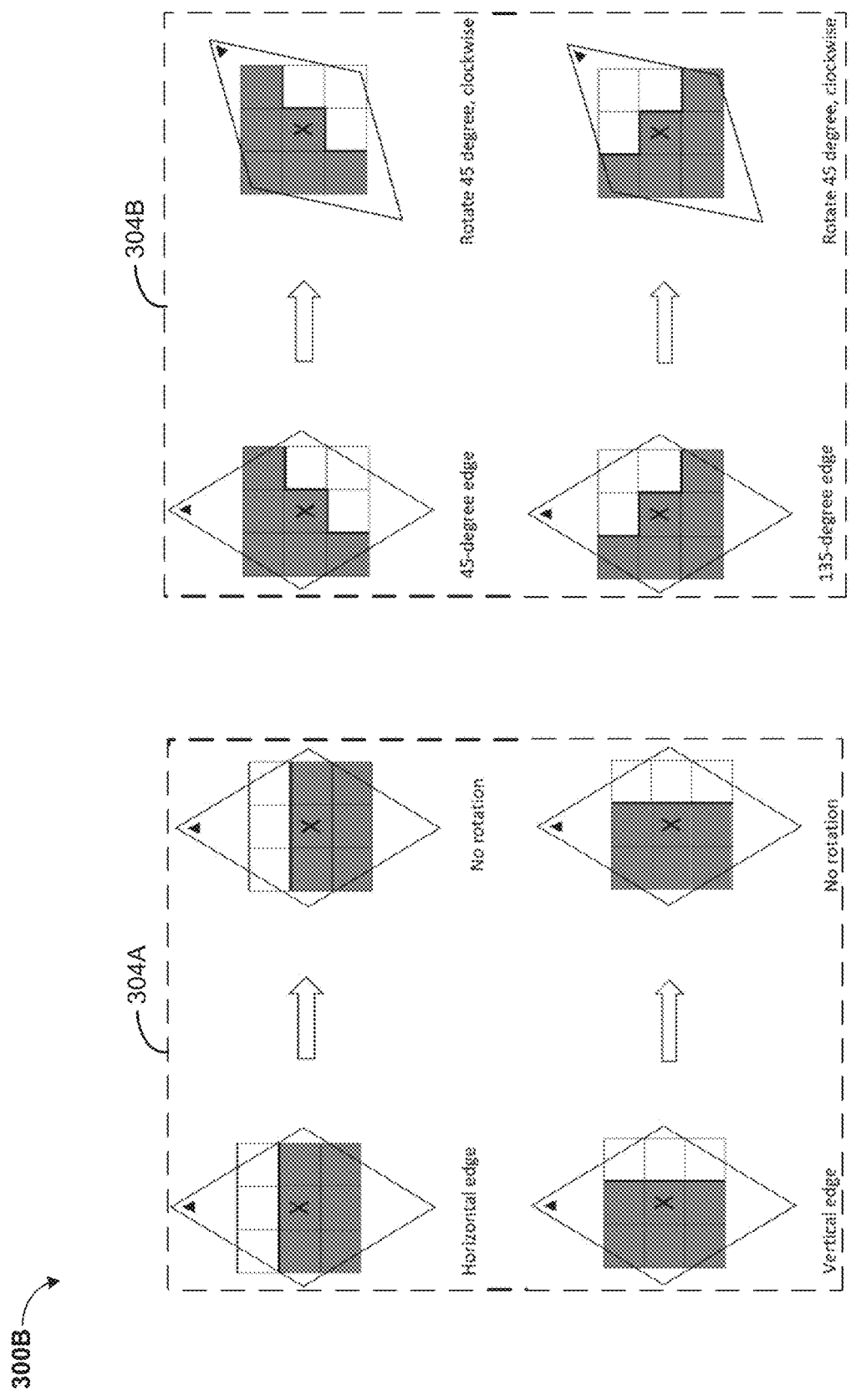

Referring now to FIG. 3B, an exemplary geometric transformation process 300B is depicted. The geometric transformation process may include, among other things, one or more pre-defined rotations 304A-B. The geometric transformation process 300B may include applying the same transformation to multiple directions. In one example, the target directions are horizontal and vertical. The rotation scheme is illustrated. When the edge direction of current block is horizontal, no rotation is performed. When the edge direction of current block is vertical, no rotation is performed. When the edge direction of current block is 45-degree, the filter coefficients or the samples in the filter support region are rotated 45 degree, clockwise. When the edge direction of current block is 135-degree, the filter coefficients or the samples in the filter support region are rotated 45 degree, clockwise. When current block is a smooth area, i.e., no edge detected, no rotation is performed. In one embodiment, rotation is performed when CCF scans all samples within current block, regardless of whether the sample is located on the edge. When saying CCF scans a sample, it refers to either one of the following two cases: 1) the sample undergoes training, or 2) filtering process of CCF. In one embodiment, rotation is performed only when CCF scans the samples that are located on the edge within current block. When saying CCF scans a sample, it means the sample undergoes training or filtering of CCF.

In one embodiment, when gradient value describes the directionality of the block, the filter coefficients or reconstructed samples in the filter support region are transformed based on the gradient value.

In one embodiment, geometric transformations of filter coefficients and clipping values may be used to perform the transformation. An Adaptive Loop Filter (ALF) with block-based filter adaption may be applied. For the luma component, one among 25 filters is selected for each 4×4 block, based on the direction and activity of local gradients. Two diamond filter shapes may be used for adaptive-loop filtering. A 7×7 diamond shape may be applied for the luma component and a 5×5 diamond shape may be applied for the chroma component.

For the luma component, each 4×4 block may be categorized into one out of 25 classes. A classification index C may be derived based on its directionality D and a quantized value of activity $\hat{A}$, as $$C = 5D + \hat{A}.$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k,l) - R(k,l-1) - R(k,l+1)|$$

$$g_h = \sum_{k=i-2}^{i+3} \sum_{l=j-2}^{j+3} H_{k,l}, \quad H_{k,l} = |2R(k,l) - R(k-1,l) - R(k+1,l)|$$

$$g_{d1} = \sum_{k=i-2}^{i+3} \sum_{l=j-3}^{j+3} D1_{k,l}, \quad D1_{k,l} = |2R(k,l) - R(k-1,l-1) - R(k+1,l+1)|$$

$$g_{d2} = \sum_{k=i-2}^{i+3} \sum_{j=j-2}^{j+3} D2_{k,l}, \quad D2_{k,l} = |2R(k,l) - R(k-1,l+1) - R(k+1,l-1)|$$

where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As will be discussed below with regard to FIG. 4, the same subsampled positions are used for gradient calculation of all directions. Then D maximum and minimum values of the gradients of horizontal and vertical directions may be set as:

$$g_{h,v}^{max} = \max(g_h, g_v), g_{h,v}^{min} = \min(g_h, g_v)$$

The maximum and minimum values of the gradient of two diagonal directions are set as:

$$g_{d1,d2}^{max} = \max(g_{d1}, g_{d2}), g_{d1,d2}^{min} = \min(g_{d1}, g_{d2})$$

To derive the value of the directionality D, these values are compared against each other and with two thresholds $t_1$ and $t_2$. If both $g_{h,v}^{max} \leq t_1 \cdot g_{h,v}^{min}$ and $g_{d1,d2}^{max} \leq t_1 \cdot g_{d1,d2}^{min}$ are true, D is set to 0. If $g_{h,v}^{max}/g_{h,v}^{min} > g_{d1,d2}^{max}/g_{d1,d2}^{min}$, and if $g_{h,v}^{max} > t_2 \cdot g_{h,v}^{min}$, D is set to 2. If $g_{h,v}^{max}/g_{h,v}^{min} > g_{d1,d2}^{max}/g_{d1,d2}^{min}$ and $g_{h,v}^{max} < t_2 \cdot g_{h,v}^{min}$, D is set to 1. If $g_{h,v}^{max}/g_{h,v}^{min} < g_{d1,d2}^{max}/g_{d1,d2}^{min}$ and if $g_{d1,d2}^{max} > t_2 \cdot g_{d1,d2}^{min}$, D is set to 4. If $g_{h,v}^{max}/g_{h,v}^{min} < g_{d1,d2}^{max}/g_{d1,d2}^{min}$ and if $g_{d1,d2}^{max} < t_2 \cdot g_{d1,d2}^{min}$, D is set to 3.

The activity value A may be calculated as:

$$A = \sum_{k=i-2}^{i+3} \sum_{l=j-2}^{j+3} (V_{k,l} + H_{k,l}),$$

where A may be further quantized to the range of 0 to 4, inclusively, and the quantized value is denoted as $\hat{A}$. For chroma components in a picture, no classification method may need be applied, i.e. a single set of ALF coefficients may be applied for each chroma component.

Before filtering each 4×4 luma block, geometric transformations such as rotation or diagonal and vertical flipping are applied to the filter coefficients f(k,l) and to the corresponding filter clipping values c(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation may be introduced:
Diagonal: $f_D(k,l) = f(l,k)$, $c_D(k,l) = c(l,k)$
Vertical flip: $f_v(k,l) = f(k, K-l-1)$, $c_v(k,l) = c(k, K-l-1)$
Rotation: $f_R(k,l) = f(K-l-1, k)$, $c_R(k,l) = c(K-l-1, k)$
where K is the size of the filter and $0 \leq k, l \leq K-1$ are coefficients coordinates, such that location (0,0) is at the upper left corner and location (K-1, K-1) is at the lower right corner. The transformations are applied to the filter coefficients f(k,l) and to the clipping values c(k,l) depending on gradient values calculated for that block. For gradient values gd2<gd1 and gh<gv, there may be no transformation that need be applied. For gradient values gd2<gd1 and gv<gh, a diagonal transformation may be applied. For gradient values gd1<gd2 and gh<gv, a vertical flip transformation may be applied. For gradient values gd1<gd2 and gv<gh, a rotation transformation may be applied.

In one embodiment, the directionality of the block is measured by both edge direction and gradient, such that the transformation of filter coefficients of CCF depends on both edge direction and gradient. In one embodiment, the edge direction determines whether the filter coefficients are rotated. In one embodiment, the gradient determines whether the filter coefficients are flipped.

In one embodiment, geometric transformation is applied in the training process of CCF. The input to this process is the directionality of samples in the examples described in reference to embodiments relevant to FIG. 2 above. Based on the directionality, the filter coefficients of CCF or the reconstructed samples in the filter support region are transformed.

Figure 4:
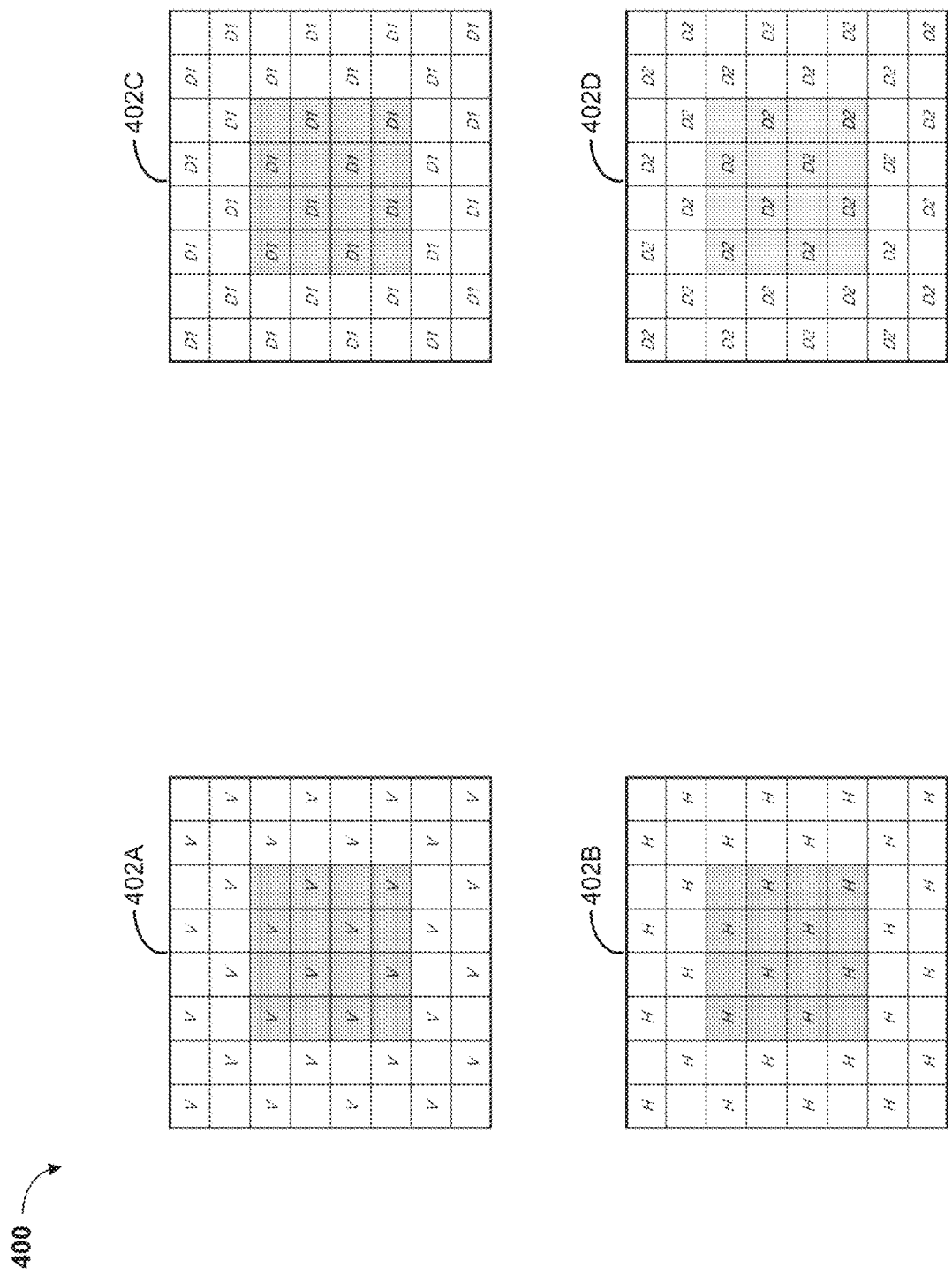
FIG. 4 is a diagram of exemplary subsampling positions for samples corresponding to one or more gradient directions, according to at least one embodiment.

Referring now to FIG. 4, a diagram 400 of exemplary subsampling positions for samples corresponding to one or more gradient directions is depicted. The subsampling positions may include positions for a sample 302A corresponding to a vertical gradient, a sample 302B corresponding to a horizontal gradient, a sample 302C corresponding to a first diagonal gradient, and a sample 302D corresponding to a second diagonal gradient. The subsampling positions V, H, D1, and D2 may correspond to the vertical, horizontal, first diagonal, and second diagonal gradients, respectively.

Figure 5:
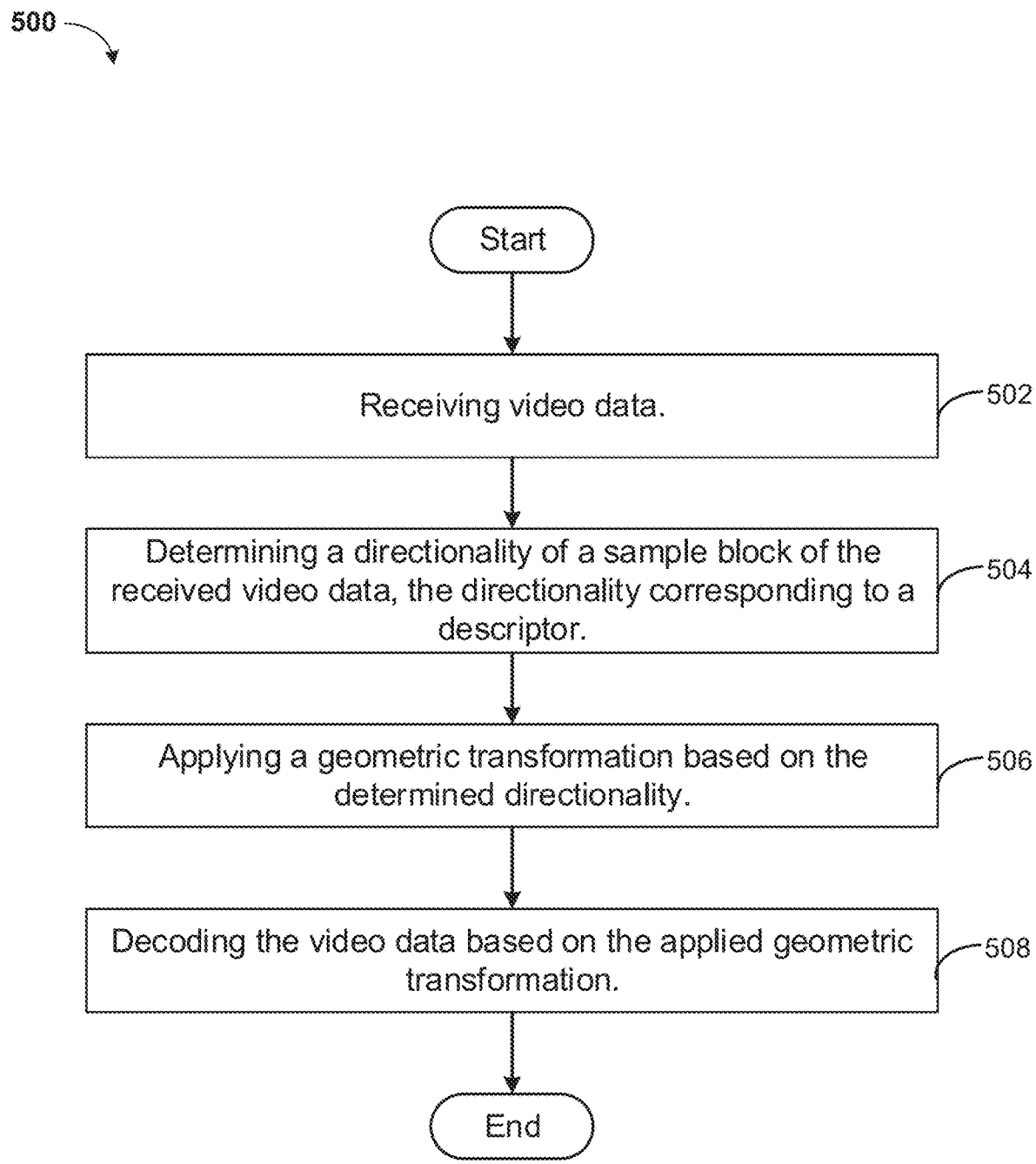
FIG. 5 is an operational flowchart illustrating the steps carried out by a program that codes video data based on applying a geometric transformation corresponding to an identified edge of the video data, according to at least one embodiment.

Referring now to FIG. 5, an operational flowchart illustrating the steps of a method 500 for coding video data is depicted. In some implementations, one or more process blocks of FIG. 5 may be performed by the computer 102 (FIG. 1) and the server computer 114 (FIG. 1). In some implementations, one or more process blocks of FIG. 5 may be performed by another device or a group of devices separate from or including the computer 102 and the server computer 114.

At 502, the method 500 includes receiving video data.

At 504, the method 500 includes determining a directionality of a sample block of the received video data, the directionality corresponding to a descriptor.

At 506, the method 500 includes applying a geometric transformation based on the determined directionality.

At 508, the method 500 includes decoding the video data based on the applied geometric transformation.

It may be appreciated that FIG. 5 provides only an illustration of one implementation and does not imply any limitations with regard to how different embodiments may be implemented. Many modifications to the depicted environments may be made based on design and implementation requirements.

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
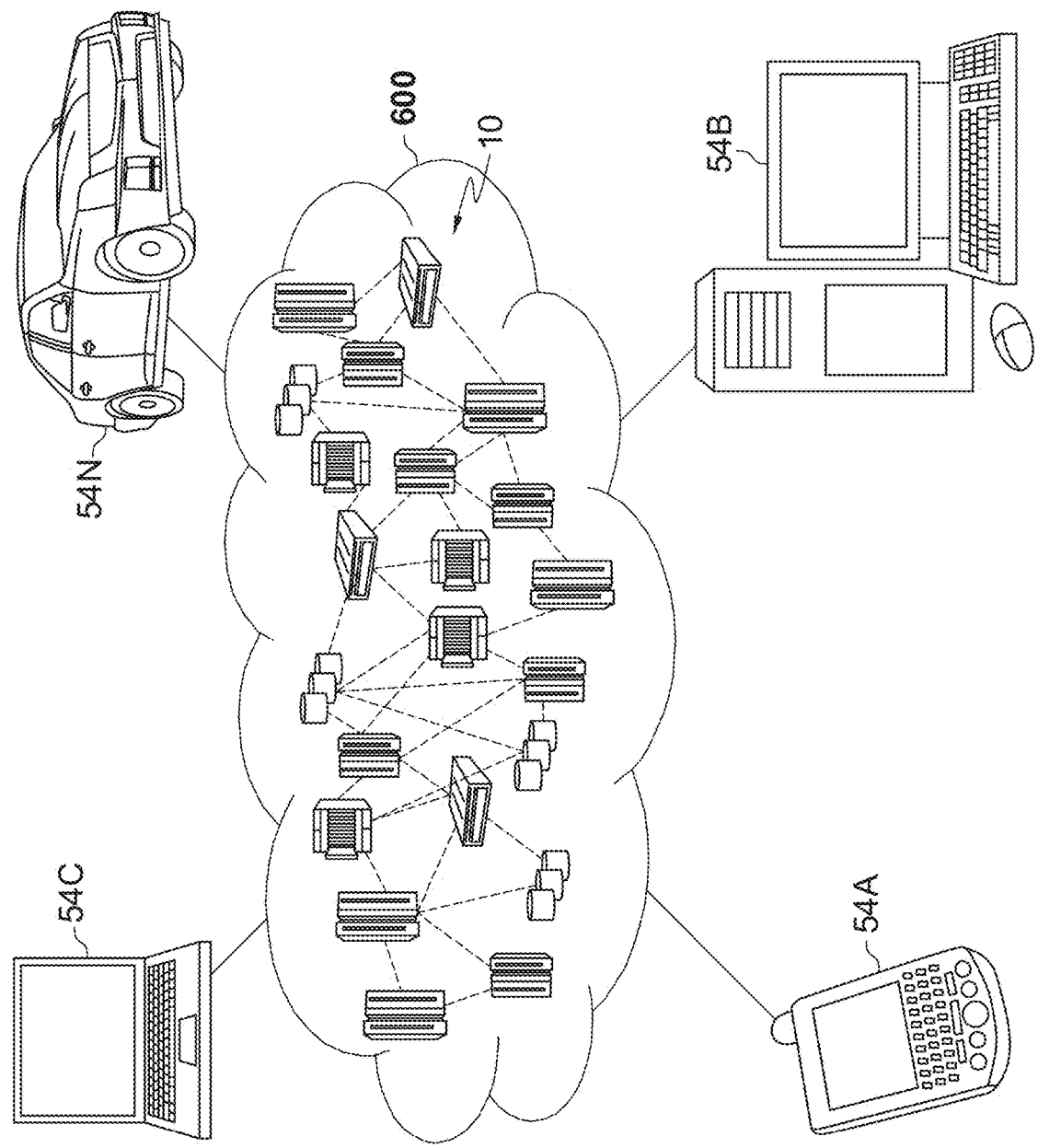
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
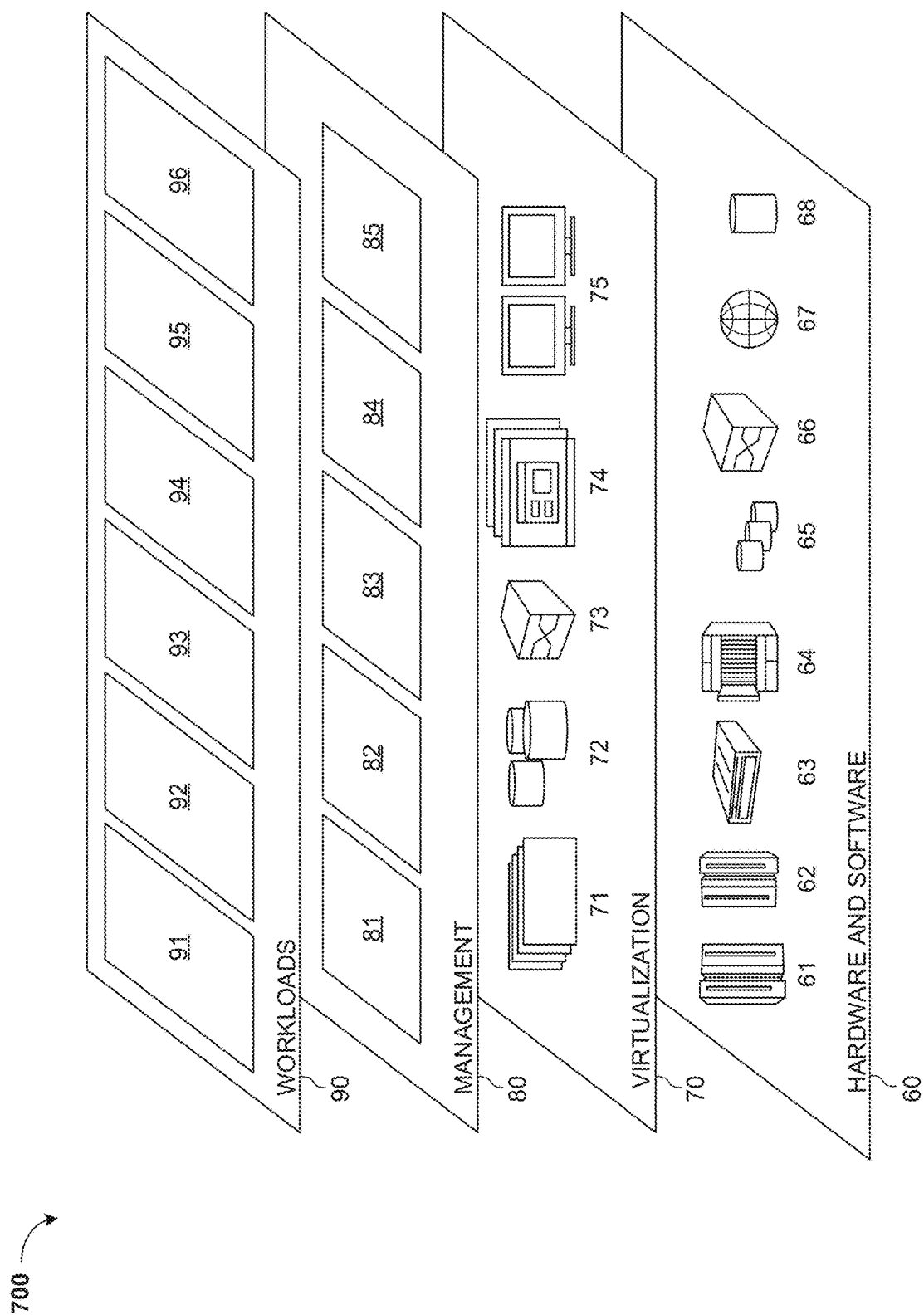
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Coding 96. Video Coding 96 may apply a geometric transformation corresponding to an identified edge of the video data.

Figure 8:
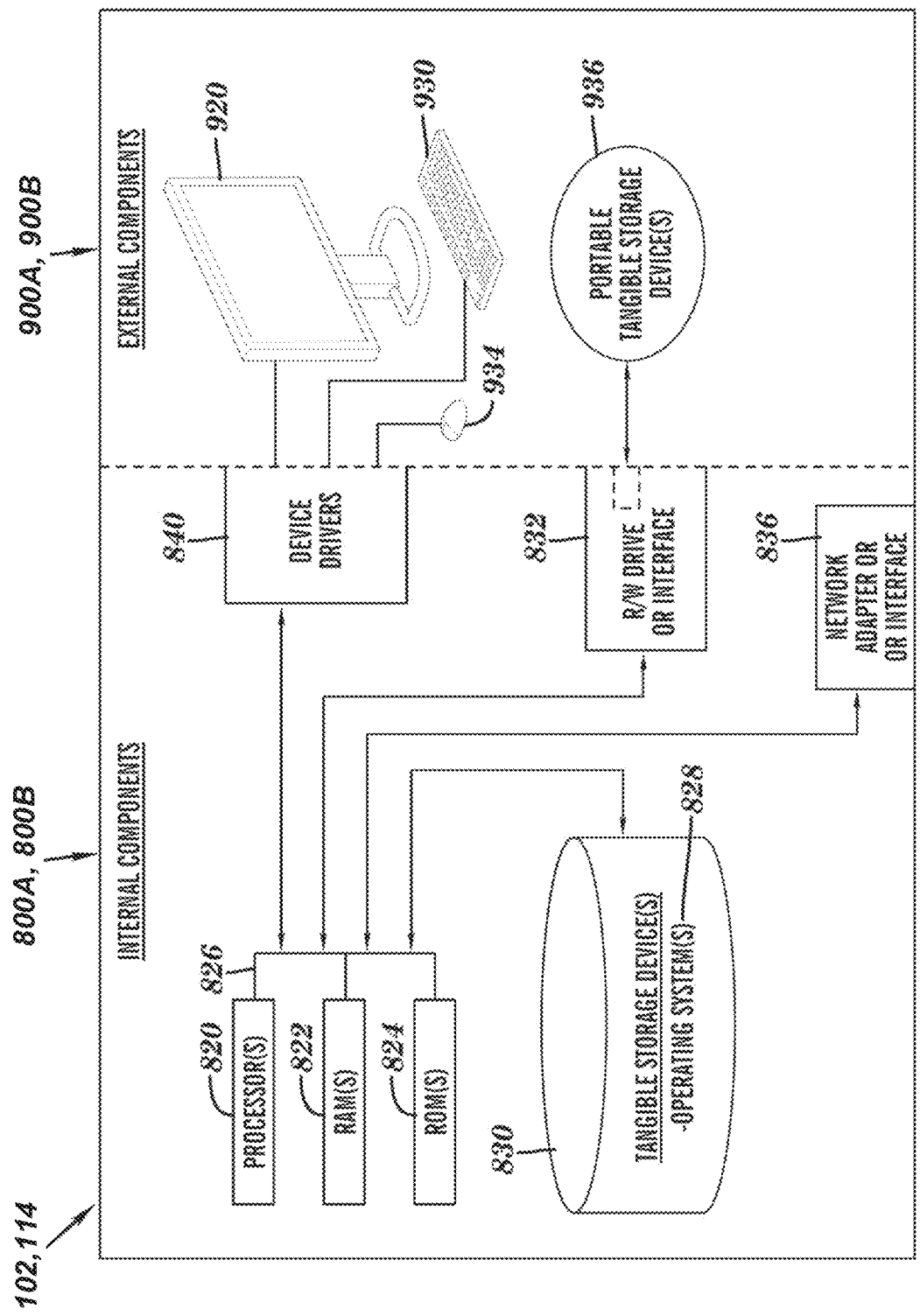
FIG. 8 is a block diagram of internal and external components of computers and servers depicted in FIG. 1 according to at least one embodiment.

FIG. 8 is a block diagram of internal and external components of computers 102, 114 depicted in FIG. 1 in accordance with an illustrative embodiment. It should be appreciated that FIG. 8 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for video coding, executable by a processor, the method comprising:
    receiving video data;
    determining a directionality of a sample block of the received video data, the directionality corresponding to a descriptor;
    applying a geometric transformation in which filter coefficients of a cross-component filter are transformed based on the determined directionality; and
    decoding the video data based on the applied geometric transformation,
    wherein rotation is performed based on the cross-component filter only scanning samples that are located on an edge within the current block.

2. The method of claim 1, wherein the descriptor corresponds to one or more from among an edge direction and a gradient value.

3. The method of claim 2, wherein based on the descriptor corresponding to an edge direction, the directionality is determined based on the edge direction and an edge position.

4. The method of claim 2, wherein based on the descriptor corresponding a gradient value, the directionality is determined based on the gradient value along a direction corresponding to an edge of the video data.

5. The method of claim 1, wherein the directionality is determined based on an input color component associated with the sample block of the received video data.

6. The method of claim 1, wherein the directionality is determined based on an output color component associated with the sample block of the received video data.

7. The method of claim 1, wherein based on the directionality of the block being identified by edge direction, the filter coefficients or reconstructed samples in the filter support region are rotated based on the identified edge direction.

8. The method of claim 7, wherein a target direction only includes one single direction.

9. The method of claim 7, wherein:
    no rotation is performed based on the edge direction of a current block being horizontal;
    the filter coefficients or the samples in the filter support region are rotated 90 degrees clockwise based on the edge direction of the current block being vertical;
    the filter coefficients or the samples in the filter support region are rotated 135 degrees clockwise based on the edge direction of the current block being 45-degree;
    the filter coefficients or the samples in the filter support region are rotated 45 degrees clockwise based on the edge direction of the current block being 135-degree;
    no rotation is performed based on the current block being a smooth area with no edge detected.

10. The method of claim 7, wherein target directions include multiple directions.

11. The method of claim 10, wherein based on the target directions being horizontal and vertical:
    no rotation is performed based on the edge direction of a current block is horizontal;
    no rotation is performed based on the edge direction of the current block is vertical;
    the filter coefficients or the samples in the filter support region are rotated 45 degrees clockwise based on the edge direction of the current block is 45-degree;
    the filter coefficients or the samples in the filter support region are rotated 45 degrees clockwise based on the edge direction of the current block is 135-degree; and
    no rotation is performed based on the current block being a smooth area with no edge detected.

12. The method of claim 1, wherein rotation is performed based on the cross-component filter scanning all samples within the current block.

13. The method of claim 1, wherein based on the directionality of the block being identified by gradient value, the filter coefficients or reconstructed samples in the filter support region are transformed based on the gradient value.

14. The method of claim 13, wherein the directionality of the block is measured by both edge direction and gradient, such that the transformation of filter coefficients of the cross-component filter is dependent on both edge direction and gradient.

15. The method of claim 14, wherein the edge direction determines whether the filter coefficients are rotated and wherein the gradient determines whether the filter coefficients are flipped.

16. The method of claim 1, wherein the geometric transformation is applied in a training process of the cross-component filter.

17. A computer system for video coding, the computer system comprising:
- one or more computer-readable non-transitory storage media configured to store computer program code; and
- one or more computer processors configured to access said computer program code and operate as instructed by said computer program code, said computer program code including:
  - receiving code configured to cause the one or more computer processors to receive video data;
  - determining code configured to cause the one or more computer processors to determine a directionality of a sample block of the received video data, the directionality corresponding to a descriptor;
  - applying code configured to cause the one or more computer processors to apply a geometric transformation in which filter coefficients of a cross-component filter are transformed based on the determined directionality; and
  - decoding code configured to cause the one or more computer processors to decode the video data based on the applied geometric transformation,
  - wherein rotation is performed based on the cross-component filter only scanning samples that are located on an edge within the current block.

18. A non-transitory computer readable medium having stored thereon a computer program for video coding, the computer program configured to cause one or more computer processors to:
- receive video data;
- determine a directionality of a sample block of the received video data, the directionality corresponding to a descriptor;
- apply a geometric transformation in which filter coefficients of a cross-component filter are transformed based on the determined directionality; and
- decode the video data based on the applied geometric transformation,
- wherein rotation is performed based on the cross-component filter only scanning samples that are located on an edge within the current block.

* * * * *